March 1, 1932. C. M. STONER 1,847,990
CUTTING MACHINE
Filed July 21, 1928 2 Sheets-Sheet 1
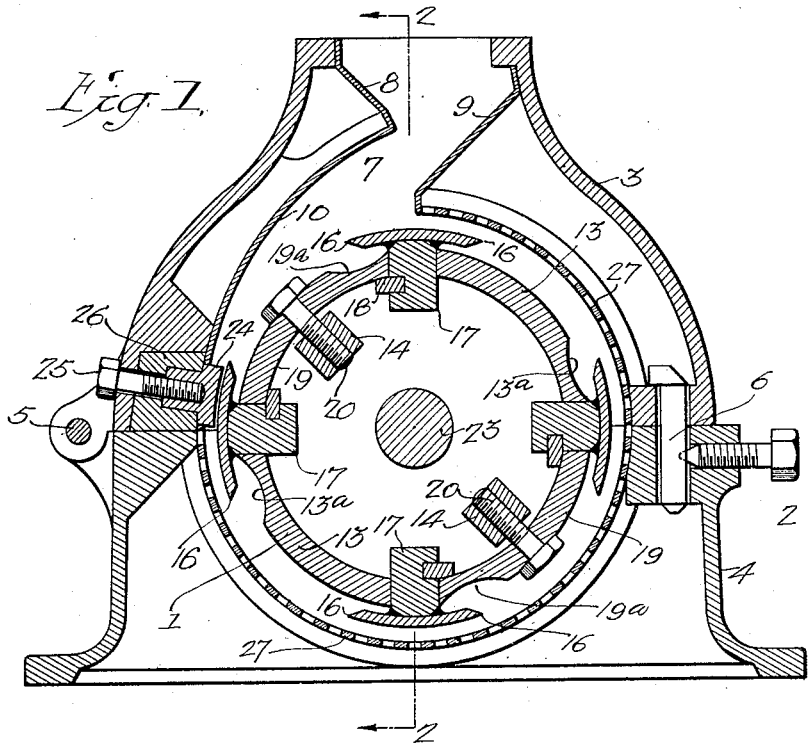
Fig. 1.
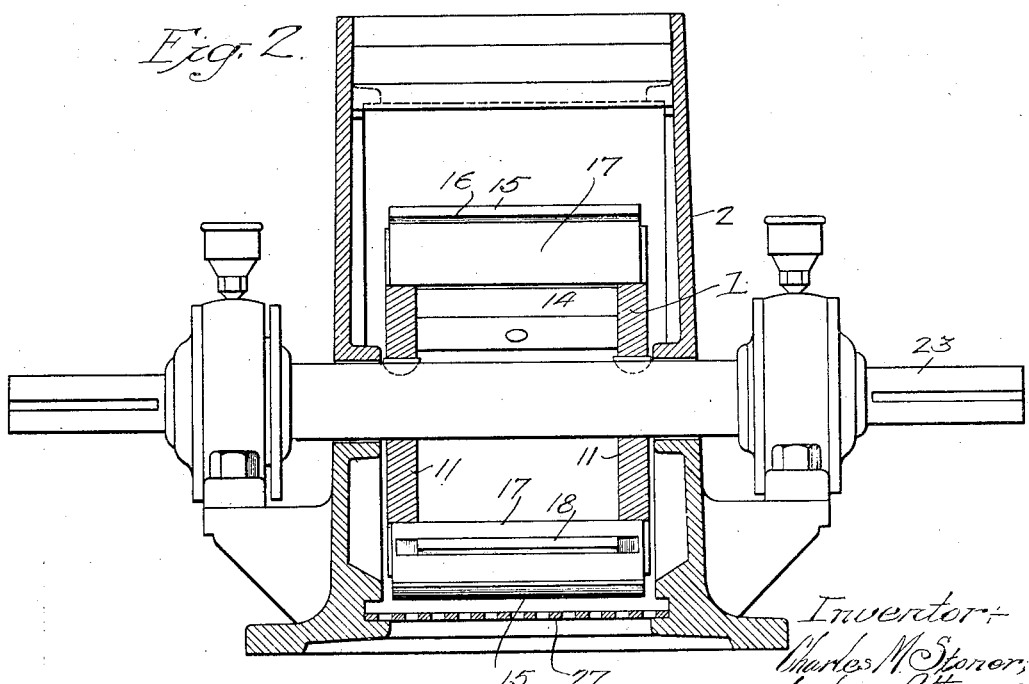
Fig. 2.
Inventor:
Charles M. Stoner,
by his Attorneys,
Howson & Howson

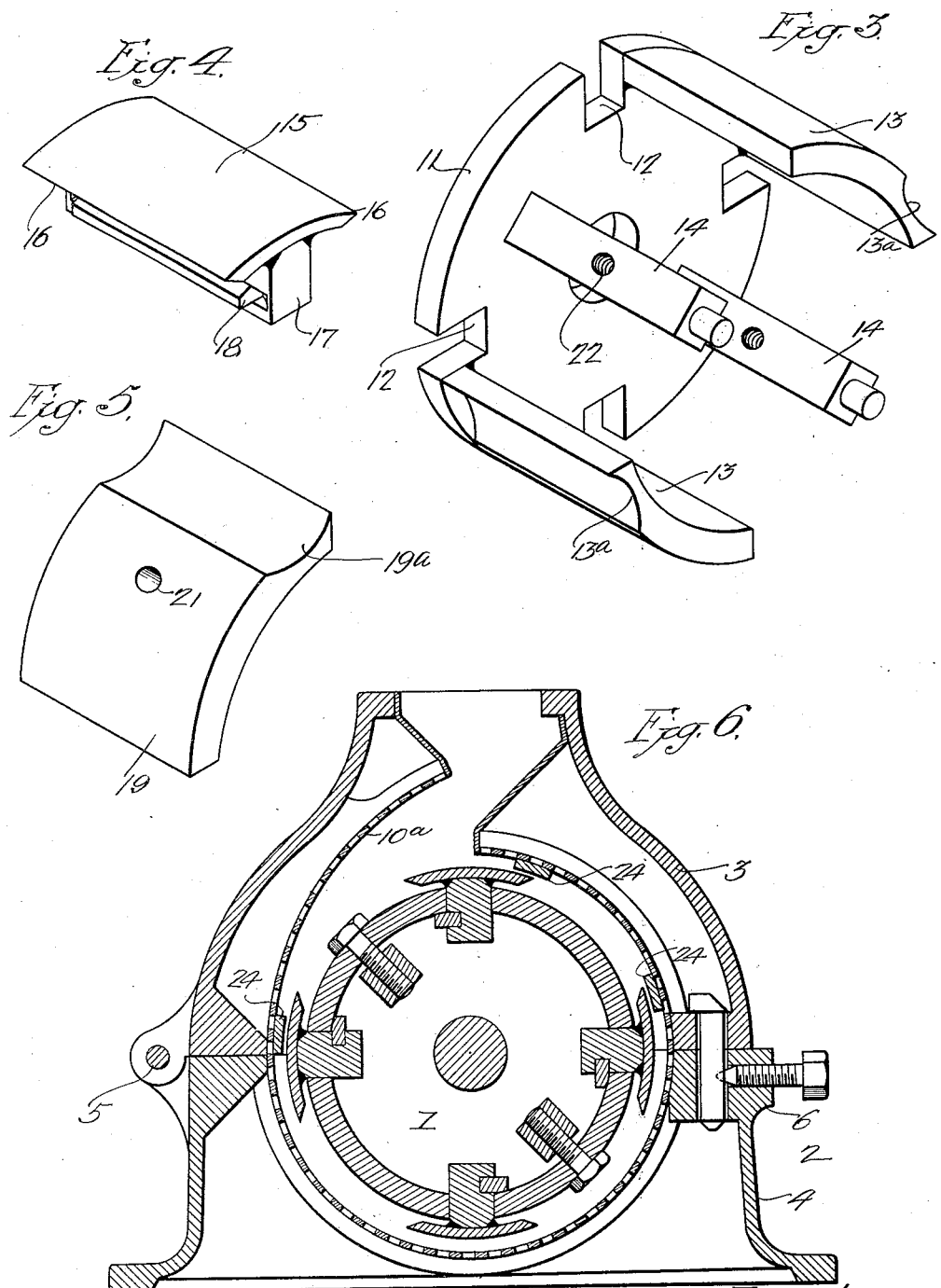

Patented Mar. 1, 1932

1,847,990

UNITED STATES PATENT OFFICE

CHARLES M. STONER, OF CHAMBERSBURG, PENNSYLVANIA, ASSIGNOR TO THE WOLF COMPANY, OF CHAMBERSBURG, PENNSYLVANIA, A CORPORATION OF PENNSYLVANIA

CUTTING MACHINE

Application filed July 21, 1928. Serial No. 294,430.

This invention is concerned with a cutting machine designed to disintegrate to a predetermined fineness a large variety of materials, such as grains, paper, dried milk, rags, roots, leathers, etc., and at the same time designed to have a greater simplicity, longevity of the cutting members, and a greater uniformity of product than the machines of the prior art.

An object of my invention is to produce a machine having the above mentioned advantages.

Another object is to produce a rotor having cutters of great durability projecting therefrom.

Another object is to design a rotor having a plurality of detachable cutters projecting therefrom.

A further object is to produce a rotor which is simply made and readily demountable.

Other objects and advantages will be apparent in the light of the following description of an exemplification of my invention, in which:

Fig. 1 is a transverse vertical section of one form of the cutting machine;

Fig. 2 is a section at right angles to Fig. 1, taken on the line 2—2 thereof;

Fig. 3 is a skeleton perspective of the rotor, one end plate being omitted for the sake of clarity;

Fig. 4 is a perspective of a cutter;

Fig. 5 is an illustration of a retaining plate, which holds the cutters in the rotor frame; and Fig. 6 is a section, similar to Fig. 1, of a modified form of my invention.

The cutting machine comprises broadly the rotor 1 housed within the casing 2.

The casing 2 in turn comprises upper and lower sections 3 and 4, hinged at 5 and provided with latching means 6.

Adjacent its top the casing 2 is provided with a passageway 7 defined by baffles 8 and 9 and guide wall 10, through which the material for the cutters is fed in a uniform flow.

The rotor is preferably cylindrical in form, and it has been found advantageous to have it of closed surface.

As perhaps better illustrated in Figs. 3–5, the rotor comprises slotted end members such as shown at 11, provided with a plurality of slots or channels 12, for the reception of cutter bars. In the present instance the number of slots will be observed to be four, although it is readily apparent that the precise number may be varied at will, without in any way departing from the scope of the invention.

Adjacent the periphery of the form of rotor shown, in diametrically opposite quadrants, members 13 may be secured in any convenient way to the end plates 11, thus defining the skeleton of the rotor.

Also secured in the end plates 11 are a pair of spacers 14, for a purpose which will be developed later.

One form of cutter, in its entirety, is shown in Fig. 4. It comprises the curved cutter 15, having opposed cutting surfaces 16, and secured by any suitable means such as welding to member 17 which in turn fits snugly in slots 12 of end plates 11. The cutter units each have a tongue or key 18 projecting from the side of member 17. As will be seen from Fig. 1, adjacent cutters are turned to present their tongues or keys extending, in opposite directions, to contact with clamp segments or retaining plates 19 (Fig. 5). These segments rest on adjacent keys 18 and retain the cutters positively and rigidly in place by suitable means such as bolts 20 fitting in bolt holes 21 of plates 19, and threading into apertures 22 of spacers 14.

It has been found possible to remove and replace the cutters in my machine in approximately 10% of the time required in making such changes on other makes of rotor cutters, resulting in greater economy. At the same time no extra mechanical skill is required to set up the cutters, inasmuch as these have been ground with micrometer accuracy prior to assembly, and before shipment from the plant.

It will be noted that because of the arcuate shape of the blades, they will stand a greater shock when striking a hard material than will the blades of the prior art.

Material entering into passageway 7 is deflected into a path between cutters 15 and a fixed blade 24, adjustably secured by bolt 25 in member 26. The downward taper given to passageway 7 by the wall 10 which preferably is of involute shape, causes the material to be crushed between the wall and the rotor to the proper degree of fineness before being presented to the action of the cutter blades. The material after passing the cutters, exits through the perforated screen 27 which extends adjacent nearly three quarters of the circumference of the rotor. Any material which is too large to pass through the perforations of the screen will be carried around by the rotor and will again pass through the cutters.

The small space between the rotor and the casing or screen accurately controls the size and quantity of the product, keeping it within such limits that it can be readily cut by the cutters, thus resulting in a lower power demand.

The members 13 and 19 each may be provided with curved depressions 13a and 19a respectively, immediately adjacent the cutters 15 and extending longitudinally of the cutters on the left hand side thereof. These depressions prevent the accumulation and clogging of material underneath the leading face of the cutter.

As will be readily seen, the action of the cutters 15 being a shearing one, and the cutting faces 16 being beveled with respect to the cutter 15, the wear will be radial, so that except for removing the cutters for resharpening, no adjustment is necessary between the cutting elements as a result of wear. The cutters, having two cutting surfaces 16, may be reversed in position to permit the fresh surface to work against the blade 24.

In Fig. 6 is shown a modified form of our invention in which substantially the only changes are that a plurality of fixed blades 24 are employed, the involute wall 10a is perforated and the depressions 13a and 19a are omitted.

Numerous other modifications will present themselves to the skilled mechanic, and it is intended that the invention be limited only by the scope of the appended claims.

I claim:

1. In a cutting machine, a rotor comprising spaced end plates, side members fixed thereto, adjacent the periphery and extending therebetween, spacing members secured to and extending between the end plates, cutters carried by the end plates, retaining members securing the cutters to said end plates and said side members, said retaining members in turn being secured to the spacing members.

2. In a cutting machine, a rotor comprising spaced end plates having slots in the surface thereof, side members fixed to the end plates and being adjacent the periphery thereof and extending therebetween, spacers fastened to and extending between the end plates, cutters carried by the end plates and lying in said slots, retaining members securing the cutters to the end plates and side members, and means for securing the retaining members to the spacers.

3. In a cutting machine, a rotor comprising spaced end plates, side members fixed thereto adjacent the periphery and extending therebetween, cutters extending from the surface of the rotor, each cutter being provided with a laterally protruding flange, and retaining members contacting with adjacent flanges and securing said cutters to said end plates and side members.

4. In a cutting machine, a rotor comprising spaced end plates, having slots in their surfaces, side members secured to said end plates adjacent their periphery and extending therebetween, cutters lying in said slots and extending from the surface of the rotor, each cutter being provided with a laterally protruding flange, and retaining members contacting with adjacent flanges and securing said cutters to said end plates and side members.

5. In a cutting machine, a rotor comprising spaced end plates, side members fixed thereto adjacent their peripheries, and extending therebetween, spacing members fixed to the end plates and likewise extending therebetween, cutters extending longitudinally of and protruding from said rotor, each cutter being provided with a laterally protruding flange, and retaining members contacting with adjacent flanges and securing said cutters to said end plates and side members, and means securing said retaining members to said spacing members.

6. In a cutting machine, a rotor comprising spaced end plates, having shallow slots in their surfaces, side members secured to said end plates adjacent their periphery and extending therebetween, spacing members fixed to the end plates and likewise extending therebetween, cutters lying in said slots and extending longitudinaly of and protruding from said rotor, each cutter being provided with a laterally protruding flange extending substantially the entire length of the cutter, retaining members contacting with adjacent flanges and securing said cutters to said end plates and side members, and means securing said retaining members to said spacing members.

7. In a cutting machine, a cylindrical rotor, a screen arranged about a portion of the extent of said rotor and substantially concentric therewith, at east one cutting element fixedly mounted on the interior of said screen and having its outer face concentric therewith throughout its length, and at least one cutting element mounted on the exterior of said rotor, said cutting element having a head concentric throughout its length with said rotor and with said first-mentioned cutting element, and having a cutting edge cooperable with said first-mentioned cutter, whereby the clearance between said cutting elements will be substantially constant regardless of refinishing of the cutting edge of the last-mentioned cutting element.

8. In a cutting machine, a rotor having a plurality of relatively stationary cutting elements, the heads of said cutting elements being of substantial width, a screen arranged about at least a portion of said rotor, a plurality of cutting elements fixed to the interior of said screen and adapted to cooperate with said first-mentioned elements, the said rotor, the entire outer faces of the heads of said first-mentioned cutting elements, the screen and the entire inner faces of the cutting elements fixed thereto being concentric, whereby the clearance between the fixed and movable cutting elements is maintained substantially constant, despite refinishing of the cutting edges of the movable elements.

CHARLES M. STONER.